(12) United States Patent
Li et al.

(10) Patent No.: US 11,722,877 B2
(45) Date of Patent: *Aug. 8, 2023

(54) METHOD FOR DISCOVERING BLUETOOTH DEVICE AND BLUETOOTH DEVICE

(71) Applicant: HUAWEI TECHNOLOGIES CO., LTD., Guangdong (CN)

(72) Inventors: Jiaxin Li, Shanghai (CN); Zhiwei Zhang, Shanghai (CN); Ji Ding, Shanghai (CN); Ya Zhang, Shenzhen (CN); Jian Chen, Shanghai (CN); Zhiqiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,956

(22) Filed: Apr. 19, 2022

(65) Prior Publication Data

US 2022/0312180 A1    Sep. 29, 2022

Related U.S. Application Data

(63) Continuation of application No. 16/324,257, filed as application No. PCT/CN2016/097723 on Aug. 31, 2016, now Pat. No. 11,343,667.

(51) Int. Cl.
*H04W 8/00* (2009.01)
*H04W 76/14* (2018.01)
(Continued)

(52) U.S. Cl.
CPC ............ *H04W 8/005* (2013.01); *H04W 4/06* (2013.01); *H04W 4/80* (2018.02); *H04W 76/14* (2018.02); *H04W 84/18* (2013.01)

(58) Field of Classification Search
CPC ......... H04W 8/005; H04W 4/06; H04W 4/80; H04W 76/14; H04W 84/18
See application file for complete search history.

(56) References Cited

U.S. PATENT DOCUMENTS

| 6,876,643 B1 | 4/2005 | Aggarwal et al. |
| 2009/0234728 A1 | 9/2009 | Willuns et al. |

(Continued)

FOREIGN PATENT DOCUMENTS

| CN | 104469980 | 3/2015 |
| CN | 105471478 | 4/2016 |

(Continued)

OTHER PUBLICATIONS

Extended European Search Report issued in European Application No. 16914609.9 dated Sep. 6, 2019, 7 pages.

(Continued)

*Primary Examiner* — Said M Elnoubi
(74) *Attorney, Agent, or Firm* — Fish & Richardson P.C.

(57) ABSTRACT

The present invention provides a method for discovering a Bluetooth device. The method includes: receiving, by a second Bluetooth device, a first broadcast frame of a first Bluetooth device; determining, by the second Bluetooth device, whether the first broadcast frame includes first indication information; and if the first broadcast frame includes the first indication information, sending, by the second Bluetooth device, at least one second broadcast frame within a preset time period after receiving the first broadcast frame, where the second broadcast frame includes second indication information, and the second indication information is used to instruct a Bluetooth device receiving the second broadcast frame to exchange information with the second Bluetooth device.

20 Claims, 4 Drawing Sheets

(51) Int. Cl.
  *H04W 4/80* (2018.01)
  *H04W 4/06* (2009.01)
  *H04W 84/18* (2009.01)

(56) References Cited

U.S. PATENT DOCUMENTS

| | | | |
|---|---|---|---|
| 2010/0105328 A1 | 4/2010 | Ahn et al. | |
| 2014/0329467 A1* | 11/2014 | Ewing | H04W 4/06 455/90.1 |
| 2015/0350334 A1* | 12/2015 | Liu | H04W 4/80 709/227 |
| 2016/0128114 A1* | 5/2016 | Moy | H04W 12/50 455/434 |
| 2017/0094587 A1 | 3/2017 | Ding et al. | |

FOREIGN PATENT DOCUMENTS

| | | |
|---|---|---|
| CN | 105577688 | 5/2016 |
| EP | 2892259 | 7/2015 |
| WO | 2016015373 | 2/2016 |

OTHER PUBLICATIONS

PCT International Search Report and Written Opinion issued in International Application No. PCT/CN2016/097723 dated Apr. 13, 2017, 15 pages (with English translation).

Strong Light Handset [Ekham Technology-Wireless Business Unit]: "Bluetooth 4.0BLE Packet Capture (2)—Broadcast Packet Parsing," Publication date: Dec. 14, 2015, 25 pages (with English translation).

Torvmark, "Three flavors of Bluetooth® Which one to choose?," Texas Instruments White Paper, Mar. 2014, 6 pages.

* cited by examiner

METHOD FOR DISCOVERING BLUETOOTH DEVICE AND BLUETOOTH DEVICE

CROSS-REFERENCE TO RELATED APPLICATIONS

This application is a continuation of U.S. patent application Ser. No. 16/324,257, filed on Feb. 8, 2019, which is a national stage of International Application No. PCT/CN2016/097723, filed on Aug. 31, 2016. Both of the aforementioned applications are hereby incorporated by reference in their entireties.

TECHNICAL FIELD

The present invention relates to the communications field, and in particular, to a method for discovering a Bluetooth device and a Bluetooth device.

BACKGROUND

Bluetooth (Bluetooth) is a radio technology that supports short-distance (for example, within 10 m) communication between devices. The Bluetooth technology can be used to exchange wireless information between devices such as a mobile phone, a PDA, a wireless headset, a laptop computer, and a peripheral device.

In the prior art, a Bluetooth device may discover another Bluetooth device through Bluetooth scanning, or may be discovered by another Bluetooth device through Bluetooth broadcasting. If a Bluetooth device A needs to discover a nearby Bluetooth device, the Bluetooth device A may perform Bluetooth scanning to scan broadcast frames broadcast by all surrounding Bluetooth devices. If a Bluetooth device B expects to be detected by the Bluetooth device A at any time, the Bluetooth device B needs to keep performing Bluetooth broadcasting, so that the Bluetooth device A can discover the Bluetooth device B.

Because the Bluetooth device B needs to keep performing Bluetooth broadcasting, power consumption of the Bluetooth device B is high.

SUMMARY

The present invention provides a method for discovering a Bluetooth device and a Bluetooth device, to reduce power consumption of the Bluetooth device.

According to a first aspect, a method for discovering a Bluetooth device is provided. The method includes:

receiving, by a second Bluetooth device, a first broadcast frame of a first Bluetooth device;

determining, by the second Bluetooth device, whether the first broadcast frame includes first indication information; and if the first broadcast frame includes the first indication information, sending, by the second Bluetooth device, at least one second broadcast frame within a preset time period after receiving the first broadcast frame, where the second broadcast frame includes second indication information, and the second indication information is used to instruct a Bluetooth device receiving the second broadcast frame to exchange information with the second Bluetooth device.

The first indication information is configured to trigger a Bluetooth device receiving the first broadcast frame to broadcast.

Optionally, the second Bluetooth device may periodically send, within the preset time period after receiving the first broadcast frame, the at least one second broadcast frame at a certain interval.

After receiving the broadcast frame including the first indication information, the second Bluetooth device sends the second broadcast frame, so as to instruct the Bluetooth device receiving the second broadcast frame to exchange information with the second Bluetooth device. This avoids that the second Bluetooth device keeps broadcasting and reduces power consumption of the second Bluetooth device.

In addition, because the second Bluetooth device does not need to keep broadcasting, a risk of leaking information of the second Bluetooth device can be reduced, security performance of the second Bluetooth device can be improved, and privacy of the second Bluetooth device can be protected.

In a possible implementation, the first broadcast frame further includes characteristic information of the first Bluetooth device, and the sending, by the second Bluetooth device, a second broadcast frame includes:

determining, by the second Bluetooth device according to the characteristic information of the first Bluetooth device, whether a preset broadcast condition is met; and if the preset broadcast condition is met, sending, by the second Bluetooth device, the second broadcast frame.

In this way, it can be avoided that the second Bluetooth device broadcasts when the preset condition is not met, and the second Bluetooth device cannot be discovered by another Bluetooth device. Therefore, security performance of the second Bluetooth device can be further improved.

In a possible implementation, the characteristic information of the first Bluetooth device includes indication information of a service that needs to be provided by another Bluetooth device and that is required by the first Bluetooth device; and the determining, by the second Bluetooth device according to the characteristic information of the first Bluetooth device, whether a preset broadcast condition is met includes:

determining, by the second Bluetooth device according to the indication information of the service, whether the service can be provided.

That the second Bluetooth device meets the preset broadcast condition includes: the second Bluetooth device can provide the service.

In this way, it can be avoided that the second Bluetooth device broadcasts when the second Bluetooth device cannot provide the service required by the first Bluetooth device, so as to reduce power consumption of the second Bluetooth device.

In a possible implementation, the characteristic information of the first Bluetooth device includes first information used to identify the first Bluetooth device; and the determining, by the second Bluetooth device according to the characteristic information of the first Bluetooth device, whether a preset broadcast condition is met includes:

determining, by the second Bluetooth device according to the first information, whether the second Bluetooth device is allowed to be discovered by the first Bluetooth device.

That the second Bluetooth device meets the preset broadcast condition includes: the second Bluetooth device is allowed to be discovered by the first Bluetooth device.

In this way, it can be avoided that the second Bluetooth device is discovered by another Bluetooth device that is not allowed to discover the second Bluetooth device. Therefore, security performance of the second Bluetooth device can be further improved.

In a possible implementation, the characteristic information of the first Bluetooth device includes second information used to identify a user of the first Bluetooth device; and the determining, by the second Bluetooth device according to the characteristic information of the first Bluetooth device, whether a preset broadcast condition is met includes:

determining, by the second Bluetooth device according to the second information, whether the user of the first Bluetooth device is a contact of a user of the second Bluetooth device.

That the second Bluetooth device meets the preset broadcast condition includes: the second Bluetooth device is the contact of the user of the second Bluetooth device.

In this way, the second Bluetooth device can only be discovered by the Bluetooth device used by the contact of the user of the second Bluetooth device, and security performance of the second Bluetooth device can be further improved.

In a possible implementation, the first broadcast frame further includes third information, and the third information is used to identify a Bluetooth device that the first Bluetooth device wants to discover; and before the sending, by the second Bluetooth device, a second broadcast frame, the method further includes:

determining, by the second Bluetooth device according to the third information, that the second Bluetooth device is the Bluetooth device that the first Bluetooth device wants to discover.

In a possible implementation, the method further includes: if the second Bluetooth device does not receive, after the preset time period, the first broadcast frame sent by the first Bluetooth device, stopping, by the second Bluetooth device, sending the second broadcast frame.

In this way, it can be avoided that the second Bluetooth device keeps sending the second broadcast frame.

In a possible implementation, the second broadcast frame further includes at least one of the following information: indication information of a service that can be provided by the second Bluetooth device, information used to identify the second Bluetooth device, or information used to identify the user of the second Bluetooth device.

In this way, the first Bluetooth device filters discovered Bluetooth devices and selects a Bluetooth device that meets the condition to exchange information.

In a possible implementation, the second indication information is used to instruct the Bluetooth device receiving the second broadcast frame to broadcast or initiate a connection to the second Bluetooth device, so as to exchange information with the second Bluetooth device.

In a possible implementation, the first Bluetooth device and the second Bluetooth device are Bluetooth low energy devices or dual-mode Bluetooth devices.

According to a second aspect, a method for discovering a Bluetooth device is provided. The method includes:

sending, by a first Bluetooth device, a first broadcast frame, where the first broadcast frame includes first indication information, and the first indication information is used to trigger a Bluetooth device receiving the first broadcast frame to broadcast;

receiving, by the first Bluetooth device, a second broadcast frame sent by a second Bluetooth device according to the first broadcast frame;

determining, by the first Bluetooth device, whether the second broadcast frame includes second indication information; and if the second broadcast frame includes the second indication information, exchanging, by the first Bluetooth device, information with the second Bluetooth device according to the second broadcast frame.

The second indication information is used to instruct a Bluetooth device receiving the second broadcast frame to exchange information with the second Bluetooth device.

The Bluetooth device broadcasts the first broadcast frame including the first indication information, and the Bluetooth device may discover the second Bluetooth device after receiving the second broadcast frame broadcast by the second Bluetooth device according to the first broadcast frame. This avoids that the discovered second Bluetooth device keeps broadcasting, and therefore power consumption of the second Bluetooth device can be reduced.

In a possible implementation, the first broadcast frame further includes characteristic information of the first Bluetooth device.

In a possible implementation, the characteristic information of the first Bluetooth device includes at least one of the following information: indication information of a service that needs to be provided by another Bluetooth device and that is required by the first Bluetooth device, first information used to identify the first Bluetooth device, or second information used to identify a user of the first Bluetooth device.

In a possible implementation, the second broadcast frame further includes at least one of the following information: indication information of a service that can be provided by the second Bluetooth device, information used to identify the second Bluetooth device, or information used to identify a user of the second Bluetooth device.

In a possible manner, the exchanging, by the first Bluetooth device, information with the second Bluetooth device according to the second broadcast frame includes: broadcasting, by the first Bluetooth device according to the second broadcast frame, or initiating a connection to the second Bluetooth device according to the second broadcast frame, so as to exchange information with the second Bluetooth device.

In a possible implementation, the first Bluetooth device and the second Bluetooth device are Bluetooth low energy devices or dual-mode Bluetooth devices.

According to a third aspect, a Bluetooth device is provided. The Bluetooth device is configured to implement the method according to the first aspect or any one of the foregoing possible implementations of the first aspect.

Specifically, the Bluetooth device may include units configured to execute the method according to the first aspect or any possible implementation of the first aspect.

According to a fourth aspect, a Bluetooth device is provided. The Bluetooth device is configured to implement the method according to the second aspect or any one of the foregoing possible implementations of the second aspect.

Specifically, the Bluetooth device may include units configured to execute the method according to the second aspect or any possible implementation of the second aspect.

According to a fifth aspect, a Bluetooth device is provided, including: a processor, a transceiver, a memory, and a bus system. The processor, the transceiver, and the memory are connected by using the bus system. The memory is configured to store an instruction or code, and the processor is configured to execute the instruction or code stored in the memory, so that the Bluetooth device executes the method according to any one of the first aspect or any possible implementation of the first aspect.

According to a sixth aspect, a Bluetooth device is provided, including: a processor, a transceiver, a memory, and a bus system. The processor, the transceiver, and the memory are connected by using the bus system. The memory is configured to store an instruction or code, and the processor is configured to execute the instruction or code stored in the memory, so that the Bluetooth device executes the method according to any one of the second aspect or any possible implementation of the second aspect.

According to a seventh aspect, a computer-readable storage medium is provided. The computer-readable storage medium stores a program, and the program enables a Bluetooth device to execute the method according to the first aspect or any possible implementation of the first aspect.

According to an eighth aspect, a computer-readable storage medium is provided. The computer-readable storage medium stores a program, and the program enables a Bluetooth device to execute the method according to the second aspect or any possible implementation of the second aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention.

In the embodiments of the present invention, the terms "first", "second", "third" and so on are intended to distinguish between different objects but do not indicate a particular order of the objects.

It should be understood that a Bluetooth device in the embodiments of the present invention may be a Bluetooth chip, or may be a terminal device having a Bluetooth chip, for example, a notebook computer, a desktop computer, a tablet computer, a portable device, a mobile phone, or a wearable device.

The Bluetooth device in the embodiments of the present invention may be a Bluetooth low energy (Bluetooth Low Energy, BLE) device, or may be a conventional Bluetooth device, or may be a dual-mode Bluetooth device that supports conventional Bluetooth and low-energy Bluetooth.

Figure 1:
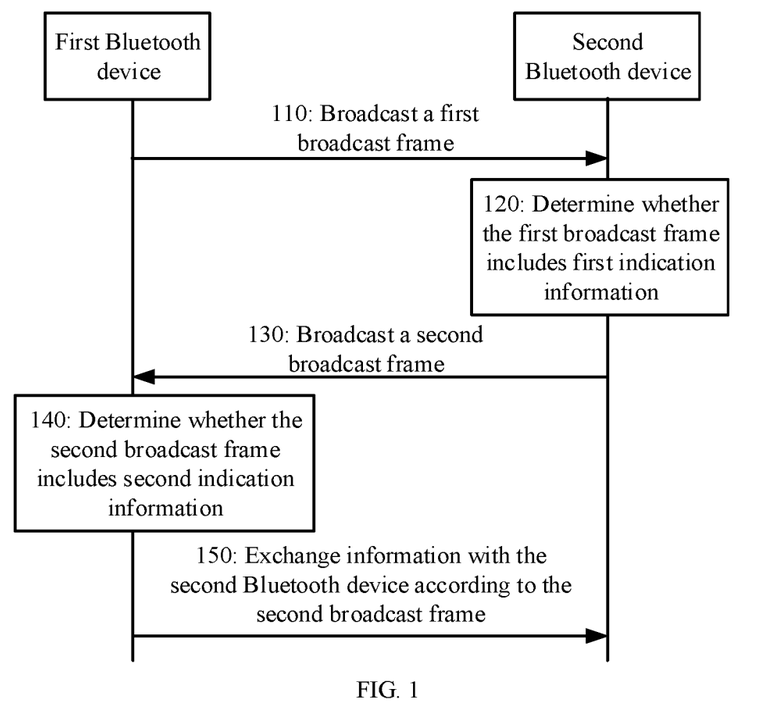
FIG. 1 is a schematic flowchart of a method for discovering a Bluetooth device according to an embodiment of the present invention.

FIG. 1 is a schematic flowchart of a method 100 for discovering a Bluetooth device according to an embodiment of the present invention. As shown in FIG. 1, the method 100 includes the following content.

110: A first Bluetooth device sends a first broadcast frame, where the first broadcast frame includes first indication information, and the first indication information is used to trigger a Bluetooth device receiving the first broadcast frame to broadcast.

Broadcasting the first broadcast frame by the first Bluetooth device may be triggered by a user.

For example, when the user wants to share a file with a contact in an application on a Bluetooth device, the user may enter a sharing interface of the application to select a corresponding sharing button, and trigger the application to send a broadcast and scanning starting command to a Bluetooth chip. The Bluetooth chip broadcasts a first broadcast frame according to the command, and starts to scan a broadcast frame broadcast by another Bluetooth device to discover the another Bluetooth device.

Optionally, the first Bluetooth device may periodically broadcast the first broadcast frame.

120: A second Bluetooth device receives the first broadcast frame and determines whether the first broadcast frame includes the first indication information.

130: If the first broadcast frame includes the first indication information, the second Bluetooth device sends at least one second broadcast frame within a preset time period after receiving the first broadcast frame, where the second broadcast frame includes second indication information, and the second indication information is used to instruct a Bluetooth device receiving the second broadcast frame to exchange information with the second Bluetooth device.

It should be understood that the second Bluetooth device may periodically or may aperiodically send the second broadcast frame within the preset time period, and this is not limited in this embodiment of the present invention.

When receiving the second broadcast frame, the first Bluetooth device may discover the second Bluetooth device.

In this embodiment of the present invention, the first broadcast frame broadcast by the first Bluetooth device and the second broadcast frame broadcast by the second Bluetooth device have different purposes. The first broadcast frame is used to trigger the Bluetooth device receiving the first broadcast frame to broadcast, that is, to discover another Bluetooth device. The second broadcast frame is used to instruct the Bluetooth device receiving the second broadcast frame to exchange information with the second Bluetooth device, that is, the second broadcast frame is used to enable another Bluetooth device to discover the second Bluetooth device. After receiving the first broadcast frame broadcast by the first Bluetooth device, the another Bluetooth device broadcasts the second broadcast frame, so that the another Bluetooth device can be discovered by the first Bluetooth device. It should be noted that, the another Bluetooth device may discover the second Bluetooth device after receiving the second broadcast frame broadcast by the second Bluetooth device.

Therefore, in this embodiment of the present invention, after receiving the first broadcast frame including the first indication information, the second Bluetooth device sends the second broadcast frame, so as to instruct the Bluetooth device receiving the second broadcast frame to exchange information with the second Bluetooth device. This avoids that the second Bluetooth device keeps broadcasting and reduces power consumption of the second Bluetooth device.

In addition, because the second Bluetooth device does not need to keep broadcasting, a risk of leaking information of the second Bluetooth device can be reduced, security performance of the second Bluetooth device can be improved, and privacy of the second Bluetooth device can be protected.

It should be understood that, when the second Bluetooth device receives the broadcast frame that is broadcast by the first Bluetooth device and that is used to discover the another Bluetooth device, the second Bluetooth device correspondingly broadcasts a broadcast frame used by the first Bluetooth device to discover the second Bluetooth device.

Optionally, the method 100 may further include: if the second Bluetooth device does not receive, after the preset time period, the first broadcast frame sent by the first Bluetooth device, stopping, by the second Bluetooth device, sending the second broadcast frame.

In other words, if the first Bluetooth device stops broadcasting, the second Bluetooth device also stops broadcasting. In this way, it can be avoided that the second Bluetooth device keeps broadcasting.

Optionally, the first broadcast frame further includes characteristic information of the first Bluetooth device. Correspondingly, that the second Bluetooth device sends a second broadcast frame in step 130 includes:

determining, by the second Bluetooth device according to the characteristic information of the first Bluetooth device, whether a preset broadcast condition is met; and if the preset broadcast condition is met, sending, by the second Bluetooth device, the second broadcast frame.

It should be understood that if the preset broadcast condition is not met, the second Bluetooth device does not broadcast, but continues scanning.

In this way, it can be avoided that the second Bluetooth device broadcasts when the preset condition is not met, and the second Bluetooth device cannot be discovered by the another Bluetooth device. Therefore, security performance of the second Bluetooth device can be further improved.

The characteristic information of the first Bluetooth device may include at least one of the following information:

information of a service that needs to be provided by the another Bluetooth device and that is required by the first Bluetooth device, first information used to identify the first Bluetooth device, or second information used to identify a user of the first Bluetooth device.

In some embodiments, the characteristic information of the first Bluetooth device includes indication information of the service that needs to be provided by the another Bluetooth device and that is required by the first Bluetooth device. Correspondingly, the determining, by the second Bluetooth device according to the characteristic information of the first Bluetooth device, whether a preset broadcast condition is met includes: determining, by the second Bluetooth device according to the indication information of the service, whether the service can be provided.

If the second Bluetooth device can provide the service, the second Bluetooth device broadcasts the second broadcast frame. If the second Bluetooth device determines that the second Bluetooth device cannot provide the service, the second Bluetooth device does not broadcast, but continues scanning.

The service may be a service that can be provided by a Bluetooth device, for example, a file sharing service, a voice transmission service, or a data storage service.

In this way, it can be avoided that the second Bluetooth device broadcasts when the second Bluetooth device cannot provide the service required by the first Bluetooth device. Therefore, power consumption of the second Bluetooth device can be reduced and security of the second Bluetooth device can be further improved.

Optionally, the characteristic information of the first Bluetooth device includes first information used to identify the first Bluetooth device. Correspondingly, the determining, by the second Bluetooth device according to the characteristic information of the first Bluetooth device, whether a preset broadcast condition is met includes: determining, by the second Bluetooth device according to the first information, whether the second Bluetooth device is allowed to be discovered by the first Bluetooth device.

The first information may include at least one of an identifier, a device name, or a device address of a Bluetooth device.

If the second Bluetooth device is allowed to be discovered by the first Bluetooth device, the second Bluetooth device broadcasts the second broadcast frame. If the second Bluetooth device is not allowed to be discovered by the first Bluetooth device, the second Bluetooth device does not broadcast, but continues scanning.

For example, the second Bluetooth device may locally store information about another Bluetooth device that is not allowed to discover the second Bluetooth device. After receiving the broadcast frame broadcast by the first Bluetooth device, the second Bluetooth device does not broadcast the second broadcast frame if determining that the first Bluetooth device is not in the pre-stored information. It should be understood that, the second Bluetooth device may locally store information about another Bluetooth device that is allowed to discover the second Bluetooth device. After receiving the broadcast frame broadcast by the first Bluetooth device, the second Bluetooth device broadcasts the second broadcast frame if determining that the first Bluetooth device is in the pre-stored information.

In this way, it can be avoided that the second Bluetooth device is discovered by the another Bluetooth device that is not allowed to discover the second Bluetooth device. Therefore, security performance of the second Bluetooth device can be further improved.

Optionally, the characteristic information of the first Bluetooth device includes second information used to identify a user of the first Bluetooth device. Correspondingly, the determining, by the second Bluetooth device according to the characteristic information of the first Bluetooth device, whether a preset broadcast condition is met includes: determining, by the second Bluetooth device according to the second information, whether the user of the first Bluetooth device is a contact of a user of the second Bluetooth device.

The second information may include at least one of an application account, a nickname, or a security digest of a phone number of the user.

If the user of the first Bluetooth device is a contact of the user of the second Bluetooth device, the second Bluetooth device broadcasts the second broadcast frame. If the user of the first Bluetooth device is not a contact of the user of the second Bluetooth device, the second Bluetooth device does not broadcast, but continues scanning.

In this way, the second Bluetooth device can only be discovered by a Bluetooth device used by the contact of the user of the second Bluetooth device, and security performance of the second Bluetooth device can be further improved.

Optionally, the first Bluetooth device may further determine a profile picture of the user of the second Bluetooth device according to the second information, and display the profile picture on a display screen.

It should be noted that the first broadcast frame may further include other device security information used for authentication, and this is not limited in this embodiment of the present invention.

Optionally, the first broadcast frame further includes third information, and the third information is used to identify a Bluetooth device that the first Bluetooth device wants to discover. Correspondingly, before the second Bluetooth device sends a second broadcast frame in step 130, the method 100 further includes: determining, by the second Bluetooth device according to the third information, that the second Bluetooth device is the Bluetooth device that the first Bluetooth device wants to discover.

If the second Bluetooth device determines that the second Bluetooth device is not the Bluetooth device that the first Bluetooth device wants to discover, the second Bluetooth device does not broadcast, but continues scanning.

In this way, the first Bluetooth device can discover the Bluetooth device that the first Bluetooth device wants to discover.

Optionally, after the first Bluetooth device receives the second broadcast frame, the method 100 may further include the following steps.

140: The first Bluetooth device determines whether the second broadcast frame includes second indication information.

150: If the second broadcast frame includes the second indication information, the first Bluetooth device exchanges information with the second Bluetooth device according to the second broadcast frame.

In other words, after discovering the second Bluetooth device, the first Bluetooth device may further exchange information with the second Bluetooth device. For example, the first Bluetooth device and the second Bluetooth device may first establish a connection and then exchange information. Specifically, the first Bluetooth device and the second Bluetooth device may establish a connection through Bluetooth, or may be connected in another wired or wireless communication manner, and this is not limited in this embodiment of the present invention. In some embodiments, the first Bluetooth device and the second Bluetooth device may exchange information through broadcasting.

For example, the first Bluetooth device and the second Bluetooth device may further be connected by using a network cable, or may be connected by using a wireless communications technology such as wireless fidelity (Wireless Fidelity, WiFi), a near field communication (Near Field Communication, NFC), or a ZigBee protocol (ZigBee).

In some embodiments, the first Bluetooth device may obtain, from the second Bluetooth device through a Bluetooth connection, information required for connection by using another wireless communications technology.

In some embodiments, the second broadcast frame may include information required for performing a subsequent connection by the Bluetooth device receiving the second broadcast frame, that is, the first Bluetooth device may further obtain, from the second broadcast frame, the information required for connection by using another wireless communications technology.

Optionally, the second broadcast frame broadcast by the second Bluetooth device may further include at least one of the following information: indication information of a service that can be provided by the second Bluetooth device, information used to identify the second Bluetooth device, or information used to identify the user of the second Bluetooth device.

The second broadcast frame includes the indication information of the service that can be provided by the second Bluetooth device. After receiving the second broadcast frame, the first Bluetooth device may determine, according to the service that can be provided by the second Bluetooth device, whether to exchange information with the second Bluetooth device.

In some embodiments, the second broadcast frame may include indication information of all services that can be provided by the second Bluetooth device. The first Bluetooth device may determine, according to the indication information, whether the second Bluetooth device can provide a service required by the first Bluetooth device.

In some embodiments, the second broadcast frame may include only indication information of a service required by the first Bluetooth device. In this case, the second broadcast frame is used to instruct the first Bluetooth device to exchange information with the second Bluetooth device, and the second Bluetooth device can provide the service required by the first Bluetooth device.

When the second broadcast frame includes the information used to identify the user of the second Bluetooth device, the first Bluetooth device may display the profile picture of the second Bluetooth device according to the information after receiving the second broadcast frame.

In this embodiment of the present invention, the first broadcast frame broadcast by the first Bluetooth device and the second broadcast frame broadcast by the second Bluetooth device have different purposes. Specifically, the first broadcast frame may include the first indication information, and the first indication information indicates that the first broadcast frame is used to trigger another Bluetooth device to broadcast. That is, a Bluetooth device (for example, the second Bluetooth device) that scans the first broadcast frame may determine, according to the first indication information, that the Bluetooth device needs to send the second broadcast frame, so that the first Bluetooth device can discover the Bluetooth device. Certainly, the first indication message carried in the first broadcast frame is only a necessary condition for triggering the second Bluetooth device to send the second broadcast frame, and whether the second Bluetooth device needs to send the second broadcast frame may further depend on another condition described in the foregoing embodiment, for example, determining whether the preset broadcast condition is met.

The second broadcast frame may include the second indication information. The second indication information indicates that the second broadcast frame is used to instruct the Bluetooth device receiving the second broadcast frame to exchange information with the second Bluetooth device. That is, a Bluetooth device (for example, the first Bluetooth device) that scans the second broadcast frame may determine, according to the second indication information, that the Bluetooth device may broadcast or initiate a connection (for example, a Bluetooth connection) to the second Bluetooth device sending the second broadcast frame, so as to exchange information with the second Bluetooth device. Certainly, the second indication information included in the second broadcast frame is only a necessary condition for triggering the Bluetooth device receiving the second broadcast frame to broadcast or initiate a connection to the second Bluetooth device, and whether the first Bluetooth device broadcasts or initiates a connection to the second Bluetooth device may further depend on another condition, for example, whether the second Bluetooth device can provide the service required by the first Bluetooth device, or whether the user of the second Bluetooth device is a contact of the user of the first Bluetooth device.

Figure 2:
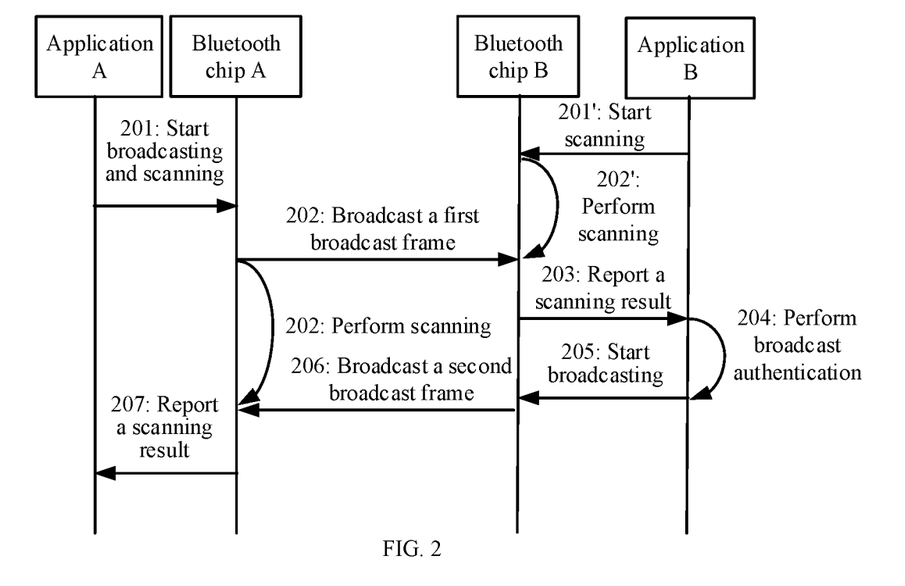
FIG. 2 is a schematic flowchart of a method for discovering a Bluetooth device according to another embodiment of the present invention.

FIG. 2 is a schematic flowchart of a method 200 for discovering a Bluetooth device according to another embodiment of the present invention. A Bluetooth device A in the embodiment shown in FIG. 2 includes an application A and a Bluetooth chip A, and a Bluetooth device B includes an application B and a Bluetooth chip B. The method 200 shown in FIG. 2 is an example of the method 100 shown in FIG. 1. For brevity, corresponding contents are appropriately omitted herein.

201: The application A on the Bluetooth device A instructs the Bluetooth chip A to start broadcasting and scanning.

For example, if a user A wants to actively discover another Bluetooth device when using the application A, the user triggers the application A to instruct the Bluetooth chip A to start broadcasting and scanning.

202: The Bluetooth chip A broadcasts a first broadcast frame and starts scanning according to an instruction of the application A, where the first broadcast frame is used to trigger a Bluetooth device receiving the first broadcast frame to broadcast, so that the Bluetooth device A can discover another Bluetooth device.

201': The application B on the Bluetooth device B instructs the Bluetooth chip B to start scanning, so that the Bluetooth chip B can discover a broadcast frame broadcast by another Bluetooth device.

For example, during startup, the application B instructs the Bluetooth chip B to start scanning. In this way, the Bluetooth chip B is always in a scanning mode, and can detect a broadcast frame of another Bluetooth device in time.

202': The Bluetooth chip B starts scanning.

203: The Bluetooth chip B scans the first broadcast frame of the Bluetooth device A, and reports a scanning result to the application B.

204: The application B performs broadcast authentication according to the first broadcast frame.

205: If authentication succeeds, the application B instructs the Bluetooth chip B to start broadcasting.

Optionally, the first broadcast frame may include account information of a user of the Bluetooth device A. If the application B determines, according to the account, that the user of the Bluetooth device A is a contact of the Bluetooth device B, authentication succeeds. If authentication in step 204 fails, the Bluetooth chip B remains in the scanning mode.

It should be understood that the first broadcast frame may further include other information, and the application B may further perform broadcast authentication according to the other information. For details, refer to the related descriptions provided above.

206: The Bluetooth chip B broadcasts a second broadcast frame, where the second broadcast frame includes second indication information, and the second indication information is used to instruct a Bluetooth device receiving the second broadcast frame to exchange information with the Bluetooth device B.

207: The Bluetooth chip A scans the second broadcast frame of the Bluetooth device B, and reports a scanning result to the application A.

At this time, the scanned Bluetooth device B may be displayed on a screen of the application A, and the application A may instruct the Bluetooth device A to establish a connection to the Bluetooth device B, so as to provide a data path for a subsequent information exchange service. The Bluetooth device A and the Bluetooth device B may use the Bluetooth chip to establish a connection through Bluetooth, or may establish a connection in another communication manner, as described above, establish a connection by using a wireless communications technology such as wireless fidelity (Wireless Fidelity, WiFi) or a ZigBee protocol (ZigBee). In some embodiments, the Bluetooth device A may exchange information with the Bluetooth device B in a broadcast manner.

Optionally, the second broadcast frame carries account information of a user of the Bluetooth device B. The application A may search for a profile picture of the user of the Bluetooth device B locally on the Bluetooth device A or in cloud storage according to the account information, and display the profile picture.

It should be understood that sequence numbers of the foregoing processes do not mean execution sequences. The execution sequences of the processes should be determined according to functions and internal logic of the processes, and should not be construed as any limitation on the implementation processes of the embodiments of the present invention. For example, steps (201 and 202) and (201' and 202') may be performed at the same time, or steps (201 and 202) may be performed before or after steps (201' and 202').

Figure 3:
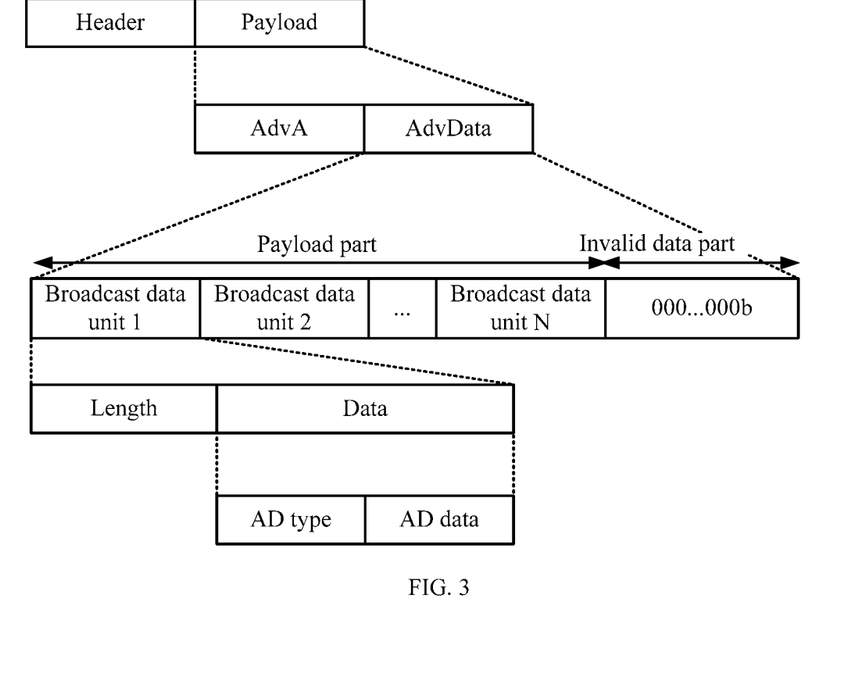
FIG. 3 is a schematic diagram of a structure of a broadcast frame according to embodiment of the present invention.

The following describes a frame structure of a broadcast frame according to an embodiment of the present invention with reference to FIG. 3. It should be understood that FIG. 3 is described by using only a frame structure in a BLE scenario as an example.

The broadcast frame includes two-byte (byte) header and effective payload (payload, the effective payload is also referred to as payload in some fields). Payload includes AdvA and AdvData, and AdvA is a broadcast address automatically filled according to a situation.

AdvData includes 31 bytes (byte), including two parts: valid data (significant) and invalid data (non-significant).

The valid data part includes several broadcast data units, which are referred to as AD Structure. As shown in FIG. 2, each AD Structure includes length (length) and data (data). The length indicates a length of the data. The data part includes an AD type (AD Type) and AD data (AD Data). The AD Type is used to indicate a type of the AD data.

In this embodiment of the present invention, a phone number or an account security digest of a Bluetooth device or device security information used for authentication may be filled in the AD Data part of the AD Structure. The AD Data part may further be filled with indication information used to indicate a purpose of the broadcast frame, so as to indicate that the broadcast frame is a broadcast frame used to trigger another Bluetooth device to broadcast, or a broadcast frame used to instruct another Bluetooth device to exchange information with the Bluetooth device. In other words, the first indication information or the second indication information described above may be filled in the AD Data part of the broadcast frame. The first indication information or the second indication information may be filled in any field of the AD Data part, and this is not limited in this embodiment of the present invention.

Figure 4:
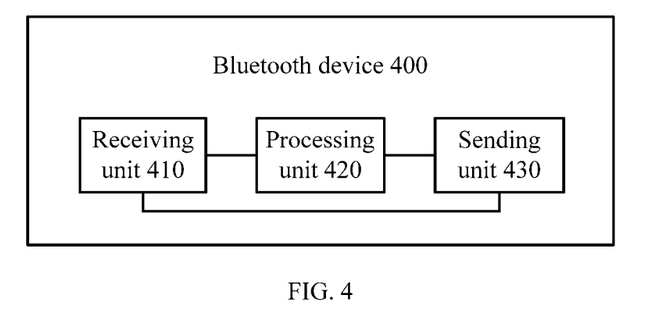
FIG. 4 is a schematic diagram of a structure of a Bluetooth device according to an embodiment of the present invention.

FIG. 4 is a schematic diagram of a structure of a Bluetooth device 400 according to an embodiment of the present invention. As shown in FIG. 4, the Bluetooth device 400 includes a receiving unit 410, a processing unit 420, and a sending unit 430.

The receiving unit 410 is configured to receive a first broadcast frame broadcast by a first Bluetooth device.

The processing unit 420 is configured to determine whether the first broadcast frame received by the receiving unit 410 includes first indication information.

The sending unit 430 is configured to: if the processing unit 420 determines that the first broadcast frame includes the first indication information, send at least one second broadcast frame within a preset time period after the receiving unit 410 receives the first broadcast frame. The second broadcast frame includes second indication information, and the second indication information is used to instruct a Bluetooth device receiving the second broadcast frame to exchange information with the Bluetooth device 400.

In this embodiment of the present invention, after receiving the broadcast frame including the first indication information, the Bluetooth device sends the second broadcast frame, so as to instruct the Bluetooth device receiving the second broadcast frame to exchange information with the Bluetooth device. This avoids that the Bluetooth device keeps broadcasting and reduces power consumption of the second Bluetooth device.

Optionally, the first broadcast frame further includes characteristic information of the first Bluetooth device. Correspondingly, the processing unit 420 is further configured to determine, according to the characteristic information of the first Bluetooth device, whether a preset broadcast condition is met. The sending unit 430 is specifically configured to send the second broadcast frame if the processing unit 420 determines that the preset broadcast condition is met.

Optionally, the characteristic information of the first Bluetooth device includes indication information of a service that needs to be provided by another Bluetooth device and that is required by the first Bluetooth device. Correspondingly, the processing unit 420 is specifically configured to determine, according to the indication information of the service, whether the Bluetooth device 400 can provide the service.

Optionally, the characteristic information of the first Bluetooth device includes first information used to identify the first Bluetooth device. Correspondingly, the processing unit 420 is specifically configured to determine, according to the first information, whether the Bluetooth device 400 is allowed to be discovered by the first Bluetooth device.

Optionally, the characteristic information of the first Bluetooth device includes second information used to identify a user of the first Bluetooth device. Correspondingly, the processing unit 420 is specifically configured to determine, according to the second information, whether the user of the first Bluetooth device is a contact of a user of the Bluetooth device 400.

Optionally, the first broadcast frame further includes third information, and the third information is used to identify a Bluetooth device that the first Bluetooth device wants to discover.

Optionally, the processing unit 420 may be further configured to: before the sending unit 430 sends the second broadcast frame, determine, according to the third information, that the Bluetooth device 400 is the Bluetooth device that the first Bluetooth device wants to discover.

Optionally, the sending unit 430 is further configured to stop sending the second broadcast frame when the receiving unit 410 does not receive, after the preset time period, the first broadcast frame sent by the first Bluetooth device.

Optionally, the second broadcast frame may further include at least one of the following information: indication information of a service that can be provided by the Bluetooth device 400, information used to identify the Bluetooth device 400, or information used to identify the user of the Bluetooth device 400.

Optionally, the second indication information is used to instruct the Bluetooth device receiving the second broadcast frame to broadcast or initiate a connection to the Bluetooth device 400, so as to exchange information with the Bluetooth device 400.

Optionally, the first Bluetooth device and the Bluetooth device 400 are Bluetooth low energy devices.

It should be understood that the Bluetooth device 400 in this embodiment of the present invention may correspond to the second Bluetooth device in the method 100 for discovering a Bluetooth device according to the embodiment of the present invention, and the foregoing and other operations and/or functions of the units in the Bluetooth device 400 are separately used to implement a corresponding process of the method 100 shown in FIG. 1. For brevity, details are not described herein again.

It should be noted that the receiving unit 410 and the sending unit 430 may be implemented by a transceiver, and the processing unit 420 may be implemented by a processor.

Figure 5:
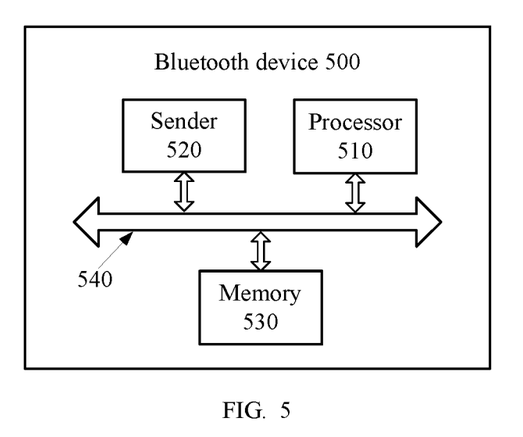
FIG. 5 is a schematic diagram of a structure of a Bluetooth device according to another embodiment of the present invention.

FIG. 5 is a schematic diagram of a structure of a Bluetooth device 500 according to another embodiment of the present invention. As shown in FIG. 5, the Bluetooth device 500 includes a processor 510, a transceiver 520, a memory 530, and a bus system 540. The memory 530 may be configured to store code and the like executed by the processor 510. The transceiver 520 is configured to send and receive a signal under control of the processor 510.

Components of the Bluetooth device 500 are coupled together by using the bus system 540. In addition to a data bus, the bus system 540 includes a power bus, a control bus, and a status signal bus. For ease of representation, various buses are marked as the bus system 540 in the figure.

The memory 530 may include a volatile memory (volatile memory), for example, a random access memory (random-access memory, RAM). The memory may also include a non-volatile memory (non-volatile memory), for example, a flash memory (flash memory), a hard disk (hard disk drive, HDD), or a solid-state drive (solid-state drive, SSD). The memory 530 may further include a combination of the foregoing types of memories.

The processor 510 may be a central processing unit (central processing unit, CPU), a network processor (network processor, NP), or a combination of a CPU and an NP. The processor 510 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL) device, or any combination thereof.

It should be understood that the Bluetooth device 500 in this embodiment of the present invention may correspond to the second Bluetooth device in the method 100 for discovering a Bluetooth device and the Bluetooth device 400 according to the embodiments of the present invention, and the foregoing and other operations and/or functions of the units in the Bluetooth device 500 are separately used to implement a corresponding process of the method 100 shown in FIG. 1. For brevity, details are not described herein again.

Figure 6:
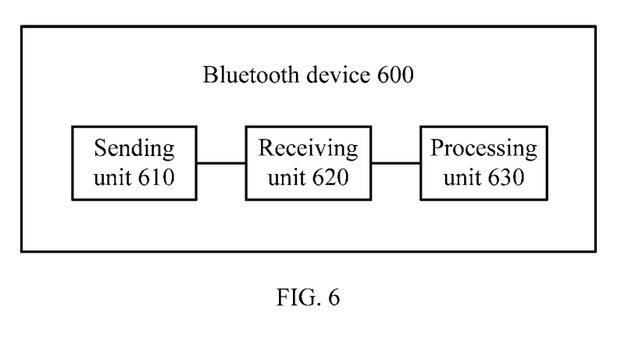
FIG. 6 is a schematic diagram of a structure of a Bluetooth device according to another embodiment of the present invention.

FIG. 6 is a schematic diagram of a structure of a Bluetooth device 600 according to another embodiment of the present invention. As shown in FIG. 6, the Bluetooth device 600 includes a sending unit 610, a receiving unit 620, and a processing unit 630.

The sending unit 610 is configured to send a first broadcast frame. The first broadcast frame includes first indication information, and the first indication information is used to trigger a Bluetooth device receiving the first broadcast frame to broadcast.

The receiving unit 620 is configured to receive a second broadcast frame sent by a second Bluetooth device according to the first broadcast frame.

The processing unit 630 is configured to determine whether the second broadcast frame received by the receiving unit 620 includes second indication information.

The sending unit 620 is further configured to: if the processing unit 630 determines that the second broadcast frame includes the second indication information, exchange information with the second Bluetooth device according to the second broadcast frame.

In this embodiment of the present invention, the Bluetooth device broadcasts the first broadcast frame including the first indication information, and the Bluetooth device may discover the second Bluetooth device after receiving the second broadcast frame broadcast by the second Bluetooth device according to the first broadcast frame. This avoids that the discovered second Bluetooth device keeps broadcasting, and therefore power consumption of the second Bluetooth device can be reduced.

Optionally, the first broadcast frame further includes characteristic information of the Bluetooth device 600.

The characteristic information of the Bluetooth device 600 may include at least one of the following information:

information of a service that needs to be provided by another Bluetooth device and that is required by the Bluetooth device 600, first information used to identify the Bluetooth device 600, or second information used to identify a user of the Bluetooth device 600.

Optionally, the second broadcast frame may further include at least one of the following information:

indication information of a service that can be provided by the second Bluetooth device, information used to identify the second Bluetooth device, or information used to identify a user of the second Bluetooth device.

Optionally, the sending unit 620 is specifically configured to broadcast, according to the second broadcast frame, or initiate a connection to the second Bluetooth device according to the second broadcast frame, so as to exchange information with the second Bluetooth device.

Optionally, the Bluetooth device 600 and the second Bluetooth device are Bluetooth low energy devices.

It should be understood that the Bluetooth device 600 in this embodiment of the present invention may correspond to the first Bluetooth device in the method 100 for discovering a Bluetooth device according to the embodiment of the present invention, and the foregoing and other operations and/or functions of the units in the Bluetooth device 600 are separately used to implement a corresponding process of the method 100 shown in FIG. 1. For brevity, details are not described herein again.

It should be noted that the sending unit 610 and the receiving unit 620 may be implemented by a transceiver, and the processing unit 630 may be implemented by a processor.

Figure 7:
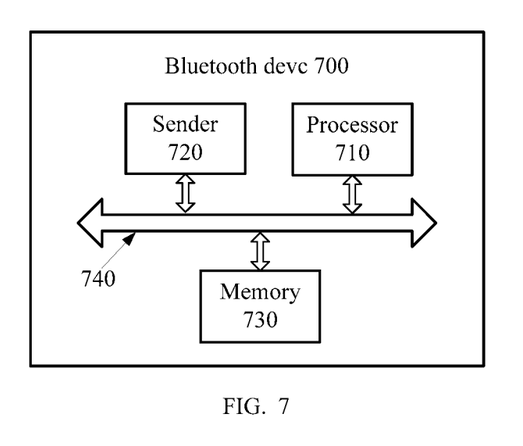
FIG. 7 is a schematic diagram of a structure of a Bluetooth device according to another embodiment of the present invention.

FIG. 7 is a schematic diagram of a structure of a Bluetooth device 700 according to another embodiment of the present invention. As shown in FIG. 7, the Bluetooth device 700 includes a processor 710, a transceiver 720, a memory 730, and a bus system 740. The memory 730 may be configured to store code and the like executed by the processor 710. The transceiver 720 is configured to send and receive a signal under control of the processor 710.

Components of the Bluetooth device 700 are coupled together by using the bus system 740. In addition to a data bus, the bus system 740 includes a power bus, a control bus, and a status signal bus. For ease of representation, various buses are marked as the bus system 740 in the figure.

The memory 730 may include a volatile memory, for example, a RAM. The memory may also include a non-volatile memory, for example, a flash memory, a hard disk drive HDD, or an SSD. The memory 730 may further include a combination of the foregoing types of memories.

The processor 710 may be a CPU, an NP, or a combination of a CPU an NP. The processor 710 may further include a hardware chip. The hardware chip may be an ASIC, a PLD, or a combination thereof. The PLD may be a CPLD, an FPGA, a GAL device, or any combination thereof.

It should be understood that the Bluetooth device 700 in this embodiment of the present invention may correspond to the first Bluetooth device in the method 100 for discovering a Bluetooth device and the Bluetooth device 600 according to the embodiments of the present invention, and the foregoing and other operations and/or functions of the units in the Bluetooth device 700 are separately used to implement a corresponding process of the method 100 shown in FIG. 1. For brevity, details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (English: Digital Subscriber Line, DSL for short) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

The invention claimed is:

1. A communication system, comprising:
a first Bluetooth device, the first Bluetooth device configured to broadcast a first broadcast frame; and
a second Bluetooth device, the second Bluetooth device configured to:
receive the first broadcast frame;
determine whether the first broadcast frame comprises first indication information; and
broadcast at least one second broadcast frame within a preset time period after receiving the first broadcast frame;

wherein the first Bluetooth device is further configured to:
receive the at least one second broadcast frame;
determine whether the at least one second broadcast frame comprises second indication information; and
if the second broadcast frame comprises the second indication information, send at least one first broadcast frame periodically within a preset time period after receiving the second broadcast frame, wherein the first broadcast frame comprises first indication information, and the first indication information is used to instruct a Bluetooth device receiving the first broadcast frame to exchange information with the first Bluetooth device.

2. The communication system according to claim 1, wherein the second Bluetooth device is further configured to receive a Bluetooth connection request from the first Bluetooth device.

3. The communication system according to claim 2, wherein the second Bluetooth device is further configured to send a response message to the first Bluetooth device in response to receiving the Bluetooth connection request to establish a Bluetooth connection with the first Bluetooth device.

4. The communication system according to claim 1, wherein the second Bluetooth device is further configured to stop broadcasting the at least one second broadcast frame when not receiving, after the preset time period, the first broadcast frame sent by the first Bluetooth device.

5. The communication system according to claim 1, wherein the second indication information is used to instruct a peer Bluetooth device receiving the at least one second broadcast frame to broadcast or initiate a connection to the second Bluetooth device to exchange information with the peer Bluetooth device.

6. A Bluetooth device, comprising:
a receiver, the receiver configured to receive a first broadcast frame broadcast by another Bluetooth device;
at least one processor;
one or more memories coupled to the at least one processor and storing programming instructions for execution by the at least one processor to determine whether the first broadcast frame comprises first indication information; and
a transmitter, the transmitter configured to broadcast at least one second broadcast frame periodically within a preset time period after receiving the first broadcast frame when the at least one processor determines that the first broadcast frame comprises the first indication information;
wherein the at least one second broadcast frame comprises second indication information, and the second indication information is configured to instruct a peer Bluetooth device receiving the at least one second broadcast frame to exchange information with the Bluetooth device.

7. The Bluetooth device according to claim 6, wherein the receiver is further configured to receive a Bluetooth connection request from the another Bluetooth device, the Bluetooth connection request is used to initiate a Bluetooth connection between the another Bluetooth device and the Bluetooth device, and the Bluetooth connection request is sent by the another Bluetooth device according to the second indication information.

8. The Bluetooth device according to claim 7, wherein the transmitter is further configured to:
send a response message to the another Bluetooth device in response to receiving the Bluetooth connection request to establish the Bluetooth connection with the another Bluetooth device.

9. The Bluetooth device according to claim 8, wherein the transmitter is further configured to transmit connection information to the another Bluetooth device through the Bluetooth connection, and the connection information includes information required for connection between the Bluetooth device and the another Bluetooth device by using another wireless communications technology.

10. The Bluetooth device according to claim 8, wherein the receiver is further configured to receive connection information from the another Bluetooth device through the Bluetooth connection, and the connection information includes information required for connection between the Bluetooth device and the another Bluetooth device by using another wireless communications technology.

11. The Bluetooth device according to claim 10, wherein the information required for connection between the Bluetooth device and the another Bluetooth device by using another wireless communications technology is information required for a Wi-Fi connection between the Bluetooth device and the another Bluetooth device.

12. The Bluetooth device according to claim 6, wherein:
the first broadcast frame further comprises characteristic information of the another Bluetooth device, and the characteristic information of the another Bluetooth device includes indication information of a service that is required by the another Bluetooth device;
the at least one processor is further configured to determine whether the service can be provided according to the characteristic information; and
the transmitter is further configured to broadcast the at least one second broadcast frame when the at least one processor determines that the service can be provided.

13. The Bluetooth device according to claim 6, wherein the first broadcast frame further comprises characteristic information of the another Bluetooth device, and the characteristic information of the another Bluetooth device is first information used to identify the another Bluetooth device;
wherein the at least one processor is further configured to determine whether the Bluetooth device is allowed to be discovered by the another Bluetooth device according to the characteristic information; and
wherein the transmitter is further configured to broadcast the at least one second broadcast frame when the at least one processor determines that the Bluetooth device is allowed to be discovered by the another Bluetooth device.

14. The Bluetooth device according to claim 6, wherein the first broadcast frame further comprises third information, and the third information is configured to identify a Bluetooth device that the another Bluetooth device wants to discover; and
wherein the at least one processor is further configured to determine, according to the third information, that the Bluetooth device is the Bluetooth device that the another Bluetooth device wants to discover before the transmitter broadcasts the at least one second broadcast frame.

15. The Bluetooth device according to claim 6, wherein the transmitter is further configured to stop broadcasting the at least one second broadcast frame when not receiving, after the preset time period, the first broadcast frame sent by the another Bluetooth device.

16. The Bluetooth device according to claim 6, wherein the second indication information is used to instruct the peer Bluetooth device receiving the at least one second broadcast frame to broadcast or initiate a connection to the Bluetooth device to exchange information with the peer Bluetooth device.

17. A Bluetooth device, comprising:
a transmitter, the transmitter configured to broadcast a first broadcast frame, wherein the first broadcast frame comprises first indication information, and the first indication information is used to trigger a peer Bluetooth device receiving the first broadcast frame to broadcast;
a receiver, the receiver configured to receive a second broadcast frame periodically sent by another Bluetooth device within a preset time period according to the first broadcast frame;
at least one processor; and
one or more memories coupled to the at least one processor and storing programming instructions for execution by the at least one processor to determine whether the second broadcast frame comprises second indication information;
wherein the transmitter is further configured to perform one of the following steps when the at least one processor determines that the second broadcast frame comprises the second indication information:
sending a connection request to the another Bluetooth device to initiate a Bluetooth connection between the Bluetooth device and the another Bluetooth device; and
broadcasting a third broadcast frame periodically, the third broadcast frame comprising information capable of being used by the another Bluetooth device to establish another type of wireless communication connection with the Bluetooth device, and the other type of wireless communication connection being different from a Bluetooth connection.

18. The Bluetooth device according to claim 17, further comprising:
a display, the display configured to display a sharing interface with a sharing button, the sharing interface being capable of being used by a user to initiate sharing function for sharing information with other device; and
wherein the transmitter is further configured to broadcast the first broadcast frame in response to detecting that the sharing button is triggered by the user.

19. The Bluetooth device according to claim 18, wherein the receiver is further configured to:
start scanning in response to detecting that the sharing button is triggered by the user; and
receive the second broadcast frame by the scanning.

20. The Bluetooth device according to claim 18, wherein the second broadcast frame comprises information of a user account of the another Bluetooth device, and the display is further configured to display the information of a user account of the another Bluetooth device.

* * * * *